US010471883B2

United States Patent
Baur et al.

(10) Patent No.: US 10,471,883 B2
(45) Date of Patent: Nov. 12, 2019

(54) SUPPORT ASSEMBLY OF A BUMPER ON A COMPONENT OF AN AUTOMOBILE AND LIGHTING UNIT FOR AN AUTOMOBILE

(71) Applicant: Daimler AG, Stuttgart (DE)

(72) Inventors: Eberhard Baur, Rottenburg (DE); Alexander Guenther, Lorch (DE)

(73) Assignee: Daimler AG, Stuttgart (DE)

( * ) Notice: Subject to any disclaimer, the term of this patent is extended or adjusted under 35 U.S.C. 154(b) by 569 days.

(21) Appl. No.: 14/783,399

(22) PCT Filed: Apr. 7, 2014

(86) PCT No.: PCT/EP2014/000926
§ 371 (c)(1),
(2) Date: Oct. 8, 2015

(87) PCT Pub. No.: WO2014/166619
PCT Pub. Date: Oct. 16, 2014

(65) Prior Publication Data
US 2016/0052443 A1    Feb. 25, 2016

(30) Foreign Application Priority Data
Apr. 11, 2013    (DE) .................. 10 2013 006 328

(51) Int. Cl.
*B60Q 1/00*    (2006.01)
*B60Q 1/04*    (2006.01)
(Continued)

(52) U.S. Cl.
CPC ............ *B60Q 1/0466* (2013.01); *B60D 1/52* (2013.01); *B60R 19/50* (2013.01); *B60R 2019/1886* (2013.01); *B60R 2019/505* (2013.01)

(58) Field of Classification Search
CPC .......... B60Q 1/0466; B60D 1/52; B60R 19/50
(Continued)

(56) References Cited

U.S. PATENT DOCUMENTS 5,984,389 A * 11/1999 Nuber ................... B60R 19/50
293/109
2005/0190573 A1    9/2005 Schwab
(Continued)

FOREIGN PATENT DOCUMENTS

DE            103 56 986 A1    7/2005
DE    10 2009 029 981 A1    1/2010
(Continued)

OTHER PUBLICATIONS

PCT/EP2014/000926, International Search Report (PCT/ISA/220 and PCT/ISA/210) dated Jun. 27, 2014, with partial English translation, enclosing Written Opinion of the International Searching Authority (PCT/ISA/237) (Ten (10) pages).
(Continued)

*Primary Examiner* — Gerald J Sufleta, II
(74) *Attorney, Agent, or Firm* — Crowell & Moring LLP

(57) ABSTRACT

A lighting unit for a passenger motor vehicle is disclosed. The lighting unit includes a housing having a lens fastened to the housing and having a sealing element supported on the housing which has a receiver to support a bumper of the passenger motor vehicle. The sealing element is fastened to the housing by a support element fastened to the housing.

5 Claims, 2 Drawing Sheets

(51) Int. Cl.
*B60D 1/52* (2006.01)
*B60R 19/50* (2006.01)
*B60R 19/18* (2006.01)

(58) Field of Classification Search
USPC .......................................................... 362/509
See application file for complete search history.

(56) References Cited

U.S. PATENT DOCUMENTS

| 2012/0280534 A1* | 11/2012 | Eipper | B62D 21/09 |
| | | | 296/187.01 |
| 2013/0088886 A1* | 4/2013 | Eckert | B60Q 1/0416 |
| | | | 362/528 |
| 2016/0068192 A1* | 3/2016 | Sakai | B62D 25/08 |
| | | | 296/187.09 |

FOREIGN PATENT DOCUMENTS

| DE | 10 2011 051 686 A1 | 1/2013 |
| JP | 3-157239 A | 7/1991 |

OTHER PUBLICATIONS

German Office Action issued in counterpart DE 10 2013 006 328.0 dated Dec. 3, 2013, with partial English machine translation (Five (5) pages).

* cited by examiner

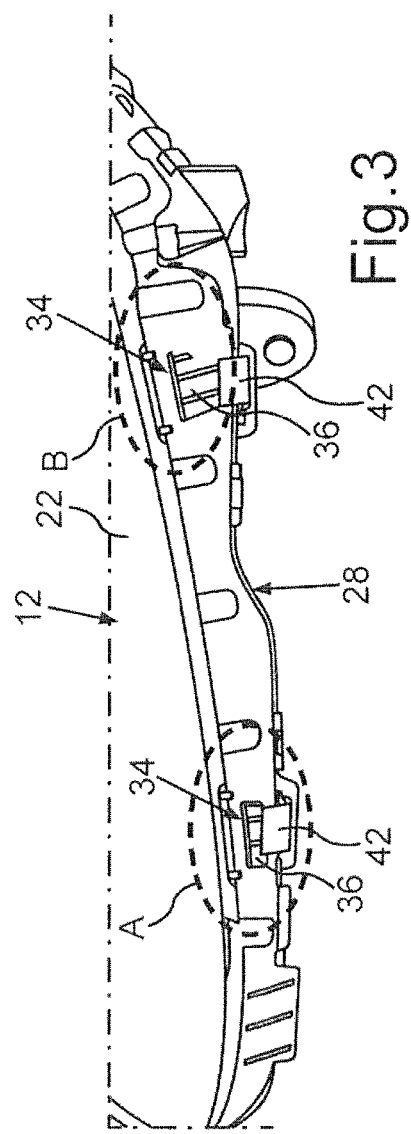
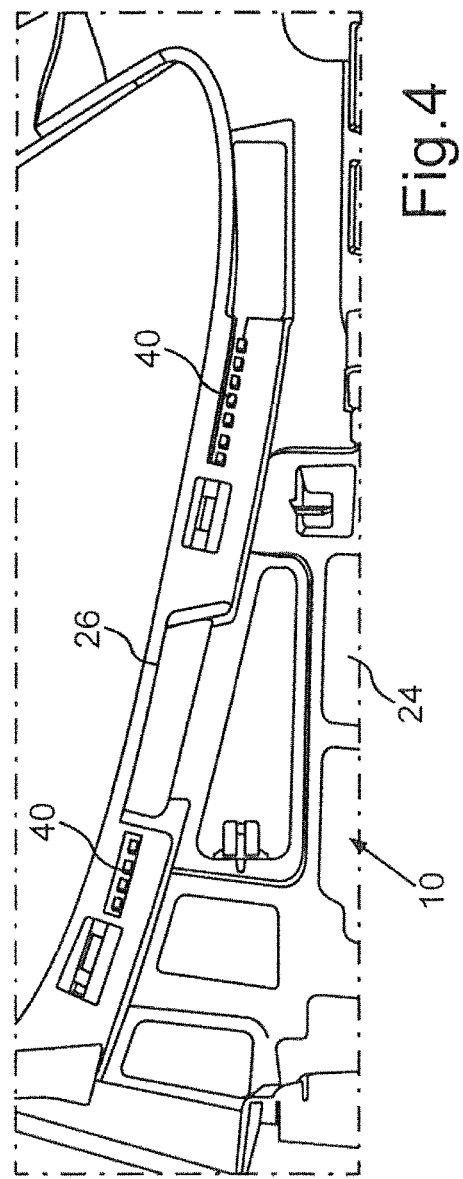

SUPPORT ASSEMBLY OF A BUMPER ON A COMPONENT OF AN AUTOMOBILE AND LIGHTING UNIT FOR AN AUTOMOBILE

BACKGROUND AND SUMMARY OF THE INVENTION

The invention relates to a support assembly of a bumper on a component of a passenger motor vehicle as well as a lighting unit for a passenger motor vehicle.

Such support assemblies are sufficiently known from series vehicle construction. The bumper comprises at least one cladding element (bumper cladding) and a corresponding support element which is usually referred to as a base support and is supported on the passenger motor vehicle via the cladding element.

In the assembled state, other construction parts, such as, for example, lighting units are adjacent to the bumper. In the course of the development of modern passenger motor vehicles, a respective join gap between the bumper and the attachment parts has been reduced in order to thereby achieve an attractive design as well as, in particular, advantageous aerodynamics of the passenger motor vehicle.

It is therefore the object of the present invention to provide a support assembly of a bumper on a component of a passenger motor vehicle as well as lighting unit for a passenger motor vehicle by means of which a particularly low and uniform join gap can be achieved.

In order to create a support assembly by means of which a particularly low and uniform join gap can be achieved, it is provided according to the invention that the component on which the bumper or its cladding element is supported by arrangement of the support element is formed as a sealing element which is supported at least indirectly on a lighting unit of the motor vehicle. This means that the bumper is supported via the support element and the sealing element on the lighting unit which, for example, is adjacent to the bumper upwards in the vehicle vertical direction. The join gap, i.e., the distance between the cladding element of the bumper and the lighting element, can hereby be kept particularly low and can be adjusted to a predeterminable, uniform dimension. Particularly good aerodynamics and an optically attractive design of the passenger motor vehicle result from this. Furthermore, the parts number, the weight and the costs can be kept low, as additional structural measures can remain undone due to the support of the bumper on the sealing element of the lighting unit. The sealing element is preferably a so-called aeroseal, which serves to at least partially seal a gap between the bumper and the lighting unit. As a consequence of this sealing, air cannot or can only slightly flow between the bumper and the lighting unit. Therefore, particularly advantageous aerodynamics of the motor vehicle can be achieved. Furthermore, it is advantageous that the join gap and therefore the gap image can be kept uniform during the so-called aging process, in particular of the cladding element which is formed, for example, from a plastic and/or of the support element formed from a plastic as well as during temperature fluctuations.

In an advantageous embodiment of the invention, the sealing element is supported at least indirectly on a housing of the lighting unit. Preferably, it is provided here that the sealing element is fastened to the housing, bypassing a lens of the lighting unit which is fastened to the housing. Therefore, forces or loads introduced from the bumper and in particular from the support element into the sealing element are not introduced into the translucent lens, but, bypassing the lens, into the housing of the lighting unit which is more stable and substantially more robust compared to the lens. Damage to the lens, for example as a consequence of relative movements of the bumper with respect to the lighting unit, can thereby be prevented. In particular, it can be prevented that the bumper rubs on the lens of the lighting unit and thereby causes the occurrence of, in particular, visible scratches of the lens. Additionally, a pressure and/or tensile loading of the lens can be prevented as, for example, loads resulting from temperature fluctuations and thermal strains accompanying this, as well as from the aging process and originating from the bumper can be introduced into the housing via the sealing element, and not into the lens.

For example, a receiving space which is partially limited by the housing is likewise at least partially limited by means of the lens, wherein at least one lighting means to emit light beams is received in the receiving space. The light beams emitted by the lighting means of the lighting unit can penetrate the surroundings of the lighting unit through the lens from the receiving space, in order to therefore illuminate, for example, a road running in the forward driving direction in front of the passenger motor vehicle. The lens can therein be formed as a diffuser lens to diffuse the light beams going through it, such that a uniform distribution of the light beams, and therefore a uniform illumination of the road, occurs.

In an advantageous embodiment of the invention, the sealing element is fastened to the housing by arrangement of at least one support element fastened to the housing, in particular a support bracket. A particular firm support of the sealing element which is formed, for example, from a plastic and in particular from rubber can hereby be achieved on the housing, such that a particularly firm support of the bumper is also able to be achieved via the sealing element and the support element on the housing. Preferably, the support element is formed to be inherently rigid and, for example, from a plastic or from a metallic material in order to therefore support the sealing element particularly firmly on the housing.

It has additionally been shown to be advantageous if the sealing element has at least one receiver in which the support element is at least partially received. Hereby a simple assembly of the support element can be achieved on the sealing element, as the support element can be arranged in a simple manner in the receiver, for example can be inserted into this.

A particularly simple assembly of the support element on the sealing element can be achieved in that the support element has at least one rib protruding in the vehicle longitudinal direction which is arranged at least in regions in the receiver. The rib can be inserted simply into the receiver in the vehicle longitudinal direction, for example downwards for the assembly of the support element on the sealing element. This is also referred to as shoeing of the support element functioning as a base support into the sealing element.

To achieve a particularly low distance and therefore a particularly low join gap between the bumper and the lighting unit, it is provided in a further embodiment of the invention that at least one partial region of the cladding element is covered upwards in the vehicle vertical direction at least by one partial region of the lens of the lighting unit.

A further embodiment is distinguished in that the sealing element is arranged underneath the lens of the lighting unit in the vehicle vertical direction. The sealing element can hereby seal a gap between the lighting unit and the bumper very well. Additionally, the support of the bumper on the sealing element can be achieved via a very large stretch running in the vehicle longitudinal direction.

Finally, it has been shown to be particularly advantageous if the sealing element is set back at least compared to a partial region of the lens in the vehicle longitudinal direction. The lighting unit is, for example, a front headlight, so the sealing element is set back compared to the lens in the vehicle longitudinal direction. Therein the sealing element can be covered at least partially outwardly in the vehicle longitudinal direction and in particular at least predominantly by the support element and/or by the cladding element, and therefore concealed, such that it is not visible. Additionally, a very low distance can therefore be depicted between the bumper and the lighting unit, in particular the lens thereof A lighting unit for a passenger motor vehicle also belongs to the invention, having a housing, having at least one lens fastened to the housing and having at least one sealing element which is supported at least indirectly on the housing. The sealing element therein has a receiver to support a bumper of the passenger motor vehicle. Advantageous embodiments of the support assembly according to the invention are considered as advantageous embodiments of the lighting unit according to the invention and vice versa. In other words, the lighting unit according to the invention can be used in the support assembly according to the invention in order to support the bumper, in particular the cladding element, by arrangement of the support element. By means of the lighting unit, therefore, only a very short distance, i.e., only a very small join gap, can be achieved between the bumper and the lighting unit itself, such that a particularly good design as well as very good aerodynamics of the passenger motor vehicle are able to be achieved.

Further advantages, features and details of the invention result from the following description of a preferred exemplary embodiment as well as by means of the drawings.

BRIEF DESCRIPTION OF THE DRAWINGS

FIG. 3 in sections, is a schematic front view onto the lighting unit; and

FIG. 4 in sections, is a schematic rear view onto the bumper.

DETAILED DESCRIPTION OF THE DRAWINGS

Figure 1:
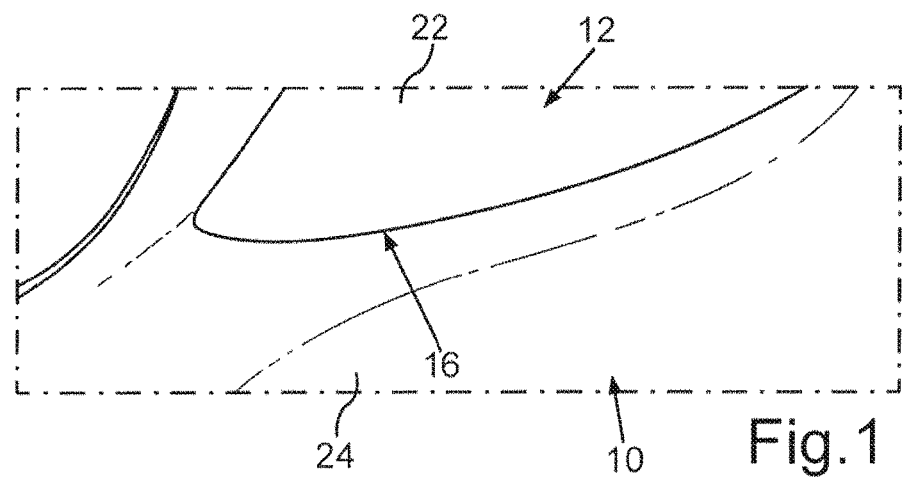
FIG. 1 in sections, is a schematic and perspective front view onto a support assembly of a bumper on a passenger motor vehicle in which the bumper is supported on this via at least one sealing element of the lighting unit which is supported at least indirectly on a housing of a lighting unit.

FIG. 1 shows, in a schematic and perspective front view, a passenger motor vehicle on which a bumper 10 as well as a lighting unit in the form of a left front headlight 12 are supported. The depiction of the left front headlight 12 below can also be transferred readily to the right front headlight of the passenger motor vehicle.

A cladding element 24 is recognizable from the bumper 10, by means of which, for example, a bending cross member which extends in the vehicle transverse direction and is not recognizable in FIG. 1 is clad. As is recognizable from FIG. 1, the front headlight 12 is adjacent to the bumper 10, and in particular the cladding element 24, upwards at least with regard to a partial region of the cladding element 24 in the vehicle vertical direction. In FIG. 1, a joint 16 is also recognizable between the front headlight 12 and the cladding element 24. In other words, the joint 16 is limited by the front headlight 12 and by the cladding element 24.

Figure 2:
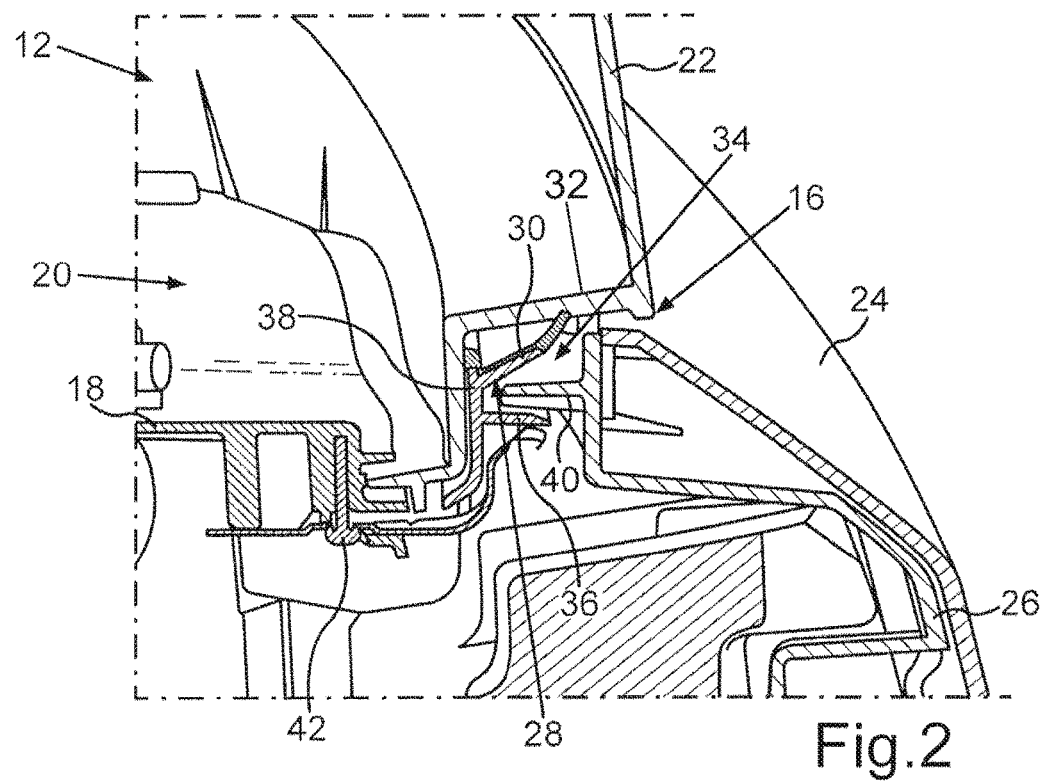
FIG. 2 in sections, is a schematic and perspective sectional view through the support assembly along a cross-sectional plane running in the vehicle longitudinal direction and in the vehicle vertical direction.

As is recognizable from FIG. 2, the front headlight 12 includes a housing 18, by which at least one receiving space 20 for at least one lighting means is limited. The receiving space 20 is limited forwards in the vehicle longitudinal direction by a translucent lens 22 which is also recognizable from FIG. 1. The housing 18 and the lens 22 can each be formed from plastic and connected to each other. For example, the lens 22 is fastened to the housing 18 by means of at least one latch connection.

As is furthermore recognizable from FIG. 2, the bumper 10 includes a cladding element 24 as well as a support element in the form of a base support 26. The cladding element 24 and the base support 26 are formed from a respective plastic, where the cladding element 24 is connected to the base support 26 and is supported on a component of the passenger motor vehicle via the base support 26.

This component is presently a sealing element 28 allocated to the front headlight 12. As is particularly well recognizable from FIG. 2, the sealing element 28 is arranged underneath at least one partial region of the lens 22 in the vehicle vertical direction, and is covered upwards in the vehicle vertical direction at least by the partial region of the lens 22. Additionally, the sealing element 28 is set back in the vehicle longitudinal direction at least compared to a partial region of the lens 22. The sealing element 28 is formed as a so-called aeroseal, which has a sealing lip 30. The sealing lip 30 abuts onto a wall 32 of the lens 22 such that the gap 16 is at least substantially sealed at least over a predominant partial region of its extension running in the vehicle transverse direction by means of the sealing element 28. As a consequence of this sealing, air cannot or can only very slightly flow between the bumper 10 and the front headlight 12 through the gap 16 during a forward drive of the passenger motor vehicle, such that particularly advantageous aerodynamics of the passenger motor vehicle can be achieved.

As is recognizable when seen together with FIG. 3, the sealing element 28 has two receivers 34 which are spaced apart from each other in the vehicle transverse direction and therefore in the longitudinal extension direction of the sealing element 28 and which are arranged in the respective regions A and B. The respective receivers 34 are—as is recognizable from FIG. 2—on the one hand at least partially limited by the sealing lip 30, i.e., upwards in the vehicle vertical direction, and on the other hand by a rib 36 of the sealing element 28, i.e., downwards in the vehicle vertical direction. The sealing lip 30 and the rib 36 are connected to each other via a bar 38, wherein the bar 38 limits the receiver 34 backwards in the vehicle longitudinal direction. Therein the sealing element 28 is produced in one piece and, for example, from a rubber, wherein the sealing lip 30, the rib 36 and the bar 38 are formed in one piece with one another. The respective receiver 34 is open forwards in the vehicle longitudinal direction such that the base support 26 can be inserted backwards in the vehicle longitudinal direction into the respective receiver 34 in a particularly simple manner.

For this purpose—as is recognizable when viewed together with FIG. 4—the base support 26 has respective ribs 40 which correspond to the receivers 34, the ribs 40 projecting backwards in the vehicle longitudinal direction with regard to the installation position of the bumper 10 supported on the passenger motor vehicle. The respective ribs 40 can now be inserted at least partially into the respective, corresponding receivers 34 in a particularly simple manner, such that the bumper 10 is supported on the front headlight 12 via the sealing element 28.

In order to prevent an excessive loading of the lens 22 by forces and/or torques originating from the bumper 10, the sealing element 28 is not supported directly on the lens 22. Rather, the sealing element 28 is fastened to the housing 18 of the front headlight 12, bypassing the lens 22, by means of at least one fastening element in the form of a support bracket 42 formed from a metallic material. Forces and/or torques originating from the bumper 10, i.e., loads, are therefore not introduced into the lens 22, but rather into the housing 18 which is substantially more robust compared to the lens 22, via the sealing element 28 and the support bracket 42. Therefore it can in particular be prevented that the bumper 10 rubs on the lens 22 and scratches this. In particular, pressure and/or tensile loading of the lens 22 can be prevented. At the same time it is possible to design the gap 16 and therefore a join gap between the front headlight 12 and the bumper 10 to be particularly narrow, which leads to an advantageous design as well as to advantageous aerodynamics of the passenger motor vehicle. Additionally, the join gap between the two components in the form of the front headlight 12 and the bumper 10 is determined in a defined manner. A change of the join gap during the life cycle of the passenger motor vehicle can also be kept low during an aging process of the components as well as during thermal loading. Furthermore, measures to conceal the gap 16 can be dispensed with, which keeps the weight and the costs of the passenger motor vehicle low.

Preferably—as is recognizable from FIG. 3—a support bracket 42 formed from a metallic material is allocated to each of the receivers 34. In other words, the two support brackets 42 are provided for fastening the sealing element 28 on the housing 18, wherein these are each arranged in the region of the corresponding receiver 34. Therefore, loads originating from the bumper 10 can be particularly well supported on the housing 18 via the support brackets 42 and not, for example, via the lens 22.

The invention claimed is:

1. A lighting unit for a passenger motor vehicle, comprising:
    a housing;
    a lens fastened to the housing; and
    a sealing element, wherein the sealing element is not supported directly on the lens and wherein the sealing element is supported on the housing, wherein the sealing element has a receiver, wherein a bumper of the passenger motor vehicle is supportable in the receiver, wherein the sealing element is fastened to the housing by a support element fastened to the housing, wherein the sealing element includes a rubber material, and wherein the sealing element at least partially seals a gap between the bumper and the lens such that air cannot or can only slightly flow between the bumper and the lens.

2. The lighting unit according to claim 1, wherein the support element is a bracket.

3. The lighting unit according to claim 1, wherein the sealing element is disposed in a vehicle vertical direction under the lens.

4. The lighting unit according to claim 1, wherein the sealing element is set back in a vehicle longitudinal direction compared to a partial region of the lens.

5. The lighting unit according to claim 1, wherein the sealing element has a sealing lip and wherein the sealing lip abuts onto a wall of the lens.

\* \* \* \* \*